(12) United States Patent
Heikkila

(10) Patent No.: US 11,426,705 B2
(45) Date of Patent: Aug. 30, 2022

(54) REDUCED POLYMER CONTENT AND BONDING IN POLYMER PARTICULATE COMPOSITE

(71) Applicant: Tundra Composites, LLC, White Bear Lake, MN (US)

(72) Inventor: Kurt Heikkila, Marine on the St. Croix, MN (US)

(73) Assignee: Tundra Composites, LLC, White Bear Lake, MN (US)

( * ) Notice: Subject to any disclaimer, the term of this patent is extended or adjusted under 35 U.S.C. 154(b) by 667 days.

(21) Appl. No.: 16/323,038

(22) PCT Filed: Aug. 4, 2017

(86) PCT No.: PCT/US2017/045504
§ 371 (c)(1),
(2) Date: Feb. 4, 2019

(87) PCT Pub. No.: WO2018/027136
PCT Pub. Date: Feb. 8, 2018

(65) Prior Publication Data
US 2019/0168186 A1     Jun. 6, 2019

Related U.S. Application Data

(60) Provisional application No. 62/370,984, filed on Aug. 4, 2016.

(51) Int. Cl.
*B01J 20/26* (2006.01)
*B01J 20/10* (2006.01)
*B01J 20/18* (2006.01)
*B01J 20/04* (2006.01)
*B01J 20/28* (2006.01)
*B01J 20/30* (2006.01)
(Continued)

(52) U.S. Cl.
CPC ............. *B01J 20/26* (2013.01); *B01J 20/043* (2013.01); *B01J 20/103* (2013.01); *B01J 20/18* (2013.01); *B01J 20/28004* (2013.01); *B01J 20/28026* (2013.01); *B01J 20/3042* (2013.01); *C08K 7/24* (2013.01); *C08K 9/04* (2013.01); *C08K 3/34* (2013.01); *C08K 3/36* (2013.01)

(58) Field of Classification Search
None
See application file for complete search history.

(56) References Cited

U.S. PATENT DOCUMENTS 3,806,566 A * 4/1974 Rubens ............... C08J 9/34
264/45.4
3,853,684 A * 12/1974 Rubens ............... C08J 9/236
428/313.5

(Continued)

FOREIGN PATENT DOCUMENTS

EP     2749301 A1     7/2014
JP     2005146243 A   6/2005

*Primary Examiner* — Joseph D Anthony
(74) *Attorney, Agent, or Firm* — Mark J. DiPietro; Fred C. Morgan

(57) ABSTRACT

Disclosed is a composite of a particulate and polymer, the composite characterized by less than enough polymer to fully occupy the available excluded volume of the particulate of the composite. The resulting composite is characterized by the particulate partially covered by the polymer leaving a substantial surface area uncovered.

17 Claims, 7 Drawing Sheets

Example-7

(51) Int. Cl.
C08K 7/24 (2006.01)
C08K 9/04 (2006.01)
C08K 3/36 (2006.01)
C08K 3/34 (2006.01)

(56) References Cited

U.S. PATENT DOCUMENTS

| | | | | |
|---|---|---|---|---|
| 4,311,541 | A * | 1/1982 | Fultz | E04B 1/80 |
| | | | | 156/78 |
| 5,354,611 | A * | 10/1994 | Arthur | C08K 7/28 |
| | | | | 264/211 |
| 10,227,490 | B2 * | 3/2019 | Heikkila | B29C 64/165 |
| 2009/0277839 | A1 * | 11/2009 | Linford | B01J 13/02 |
| | | | | 210/656 |
| 2010/0112032 | A1 * | 5/2010 | Guelcher | A61L 27/44 |
| | | | | 424/423 |
| 2013/0005846 | A1 * | 1/2013 | Yamazaki | B82Y 30/00 |
| | | | | 521/149 |
| 2013/0287937 | A1 * | 10/2013 | Joo | B01D 67/0046 |
| | | | | 427/126.4 |
| 2014/0060727 | A1 | 3/2014 | Stouffer et al. | |
| 2016/0002468 | A1 * | 1/2016 | Heikkila | C08K 7/02 |
| | | | | 428/35.6 |
| 2016/0118636 | A1 * | 4/2016 | Jin | H01M 50/449 |
| | | | | 429/233 |

* cited by examiner

REDUCED POLYMER CONTENT AND BONDING IN POLYMER PARTICULATE COMPOSITE

CROSS-REFERENCE TO RELATED APPLICATION

This application claims the benefit of a 371 international application PCT/US17/45504, filed Aug. 4, 2017. PCT/US17/45504 claims the benefit of U.S. Provisional Patent Application 62/370,984 Serial No., filed Aug. 4, 2016. Both applications are hereby incorporated by reference in their entirety.

FIELD

A composite of a particulate and polymer, the composite characterized by less than a sufficient amount of polymer to fully occupy the available excluded space of the composite is disclosed. Such a material has unique properties for treating a mobile medium that arise from the use of minimal amounts of polymer in the composite. The composite obtains exposed surfaces of the particulate that obtains unique properties such as a degree of porosity, bulk density and viscoelastic characteristics.

BACKGROUND

Particle polymer composites have been made by combining particulate and polymer to form a composite in which the particulate is dispersed in a polymer matrix. In conventional composites, the composite is intentionally compounded such that the composite is filled with particulate and polymer with no void spaces or porosity. The excluded volume is intentionally filled, voids are intentionally avoided and minimal or no void spaces remain within the composite after compounding. This compounding method maximizes the properties of the composite, relating to the nature of the particulate and the polymer, such as tensile strength, density, modulus, elongation and impact strength.

In Heikkila U.S. Pat. No. 7,491,356, and later related filings, a particle and polymer composite is disclosed having improved viscoelastic and thermoplastic character. In these composites the unique viscoelastic and thermoplastic character arises from the dispersion of an interfacial modifier (IM) coated particulate in a polymer matrix. The material is compounded and extruded such that the polymer fully occupies the excluded volume of the coated particulate. Without a substantially continuous polymer phase, both the thermoplastic and viscoelastic nature of the material would be substantially changed. In such materials, the particle and associated particle properties are less important since the particulate surface is substantially covered by the polymer.

A substantial need exists for a composite material that can obtain the advantages of a polymer phase but can obtain maximum benefit of the chemical, absorptive, adsorptive and physical nature of the particulate surface.

BRIEF DESCRIPTION

We have found that a unique set of properties can be obtained by forming a substantially different type of composite with unique properties such as a degree of porosity, bulk density and viscoelastic properties. The composite is formed with a structure that does not maximize the composite properties such as tensile strength, density, modulus, elongation and impact strength. The claimed composite has a structure different than the conventional composite. The particulate in the claimed composite has excluded volume and is not fully filled leaving void spaces or volumes and leaving the particulate surface exposed. The excluded volume of the particulate is less than 40 vol. %, less than 30 vol. %, less than 20 vol. % or less than 15 vol. %. The resulting composite has a distribution of voids or void spaces throughout the composite obtaining a porous structure, with reduced bulk density. The claimed composite chemical and physical properties are different than conventional composites. In comparison to the conventional composite, the reduced polymer in the excluded volume obtains increased porosity, reduced bulk density, reduced tensile strength, reduced density, reduced modulus, reduced elongation and reduced impact strength when compared to a composite with occupied excluded volume. The bulk density of any of the claimed composite embodiments is less than the bulk density of the fully filled composite materials when the similar particulate and polymer are used even with an IM. The bulk density is at most 95% of the filled material. The preferred composite is a friable material and can easily be powdered. The material can be shaped but does not retain such a shape when exposed to mechanical stress.

These differences in structure and properties results in unique product applications. The composite particulate exposes an amount of surface area of the particle in the porous composite to contact with any material that contacts the surface.

In our previous work in composite materials, the design goal was to form a compounded or fully filled composite. In such materials, the use of an interfacial modified particle obtained the desired viscoelastic properties, full packing, useful production rheology, and a coated particle that has a substantially inert surface that substantially concealed underlying particle chemistry from the polymer phase. The combination of the polymer phase and the interfacial modifier concealed the particulate from the surrounding polymer environment. These materials were intentionally formulated and produced to eliminate internal void spaces/porosity. Any such space (porosity) would reduce density, electrical properties, packing fraction and viscoelastic properties needed for the intended applications. In such composites, we have found that as the amount of particulate increases, the interfacial modifier permits a useful composite at packing levels as high as 90+% or higher depending om morphology.

In more recent work we have found that an intentional introduction of porosity (voids or spaces) into the composite provided new properties the composite. We have shown that the porosity in the composite exposes that surface of the particulate to any mobile phase (gaseous or liquid) that can penetrate the composite and contact the particle surface. The term mobile phase includes and gaseous or liquid material that can penetrate or flow through the porous structure of the composite. Gaseous mobile phases include ambient air, hydrogen, nitrogen, $CO_2$, that contain components or contaminants that can be changed or removed by the particulate. Liquid mobile phases include ambient water, hydrocarbons, etc. Such mobile phases contain components or contaminants that can be chemically changed or physically removed by the particulate or polymer in the composite. Such composites can act as desiccants, VOC absorbers, catalysts, etc. In any composites attempted with intentionally introduced voids/porosity, the absence of the IM causes the composite to have unacceptably high production rheology and cannot be extruded from existing equipment without exceeding safe operating torque. An IM is essential for the introduction of voids spaces or volumes. This is more noted in composites with an increased amount of particulate or increasingly rough/aspherical particulate.

The following table shows useful component amounts and aspects of the composite.

TABLE 1

| | Composite | | | | | |
|---|---|---|---|---|---|---|
| Composite Aspect | Vol % | Vol. % | Vol. % | Vol. % | Vol. % | Vol. % |
| Polymer | Balance | Balance | Balance | Balance | Balance | Balance |
| Particulate 1 | ≥$V_f$ and 40-95 | ≥$V_f$ and 45-90 | ≥$V_f$ and 50-85 | ≥$V_f$ and 5-90 | ≥$V_f$ and 8-80 | ≥$V_f$ and 10-70 |
| Particulate 2 | 0 | 0 | 0 | 5-90 | 8-80 | 10-70 |
| Interfacial Modifier | 0.001-10 | 0.01-8 | 0.05-5 | 0.001-10 | 0.01-8 | 0.05-5 |
| Excluded Volume of Particulate | ≥15 | ≥20 | ≥30 | ≥15 | ≥20 | ≥30 |
| Porosity/Void Space | ≤40 | 1-35 | 2-30 | ≤40 | 1-35 | 2-30 |

An embodiment comprises a composite with a single particulate. In the mono-disperse the particles are greater than 10 microns in diameter. Still another embodiment comprises a composite with a bi-disperse particle blend of a first particulate and a second particulate, wherein the ratio of the first particle size to the second particle size is about 1:5-10. In the bi-disperse the particles are greater than 10 microns in diameter. Still another is a composite that is a tri-disperse that contains a third particulate, wherein the ratio of the third particle size to the second particle size is about 1:5-10. In the tri-disperse composite the third particulate can be less than 20 microns and less than 10 microns.

An embodiment comprises composite comprising greater than about 50 vol. % or 30 vol. % of a particulate and less than about 50 vol. % or 30 vol. % of a polymer; wherein the composite has a bulk density of less than about 0.5 g-cm$^{-3}$. In the mono-disperse composite the occupied volume is about 63% and the excluded volume is 37% or less depending on formulation. In the bi-disperse composite the occupied volume is about 74% and the excluded volume is about 26% or less depending on formulation. In the tri-disperse composite the occupied volume is about 85% and the excluded volume is about 15% or less depending on formulation.

The embodiment further relates to a particulate material with a coating of an interfacial modifier (IM) that through the selection of particle type, particle porosity, particle size and particle shape can form the desired composite structure and properties.

The embodiment further relates to a composite of a particulate material and a polymer of a selected molecular weight as measured by melt flow index such that the polymer molecular weight is reduced as particulate circularity and roughness in morphology increases. Further as particulate circularity and roughness in morphology increases the amount of interfacial modifier increases. With correct selection of polymer, interfacial modifier amount and the selection of particle type, particle porosity, particle size and particle shape the desired composite structure and properties can be obtained.

In other words, the melt flow properties of the interfacially modified composite is substantially independent of the particle content. For this disclosure, the term "particulate" refers to a collection of individual finely divided particles. The particulate has a range of roughness or morphologies. The maximum particle size is less than 500 or 300 microns or less than 120 microns. The particulate, coated with interfacial modifier, is dispersed into a thermoplastic polymer. In the particulate, the maximum volume packing fraction ($V_p$) is the minimum amount of particulate. The composite obtains sufficient porosity to expose the particulate to a mobile phase in contact with the composite such that the phase or any material entrained in the phase can be changed chemically of physically by the particulate.

For this disclosure, the term "interfacial modifier (IM)" refers to an organic or metal organic compound that coats the spherical and rough aspherical particles before compounding. The IM obtains freedom of movement of the particle in the composite, the desired viscoelastic nature, production rheology, packing and reduced particle/particle and particle/polymer interaction. The IM also obtains, in the composite with intentional void/porosity, production rheology as the particle content exceeds about 50 to 60 vol % in the composite. In this disclosure, all percentages are based on the composite.

For this disclosure, the term "different particulate" refers to a combination of two or more particulate products or collections that differ in composition or average particle size.

For this disclosure, the term "comminution" means the reduction of an extruded mass to a particulate of a specific particle size range.

For this disclosure, in a particle polymer composite, the term "particulate excluded volume" refers to the volume within the composite that cannot be occupied by the polymer or the particulate. In a packed mass containing only particulate the excluded volume remains unoccupied by the composition of the particle. The "packed mass of a particulate" refers to the particle free of polymer after the particle is intentionally packed to a substantially maximum packing density that leaves the excluded volume outside the surface of the particulate.

For this disclosure, the term "the particulate surface area unavailable to contact by the presence of polymer" refers to the nature of the surface area of the particulate. The polymer occupies a proportion of the excluded volume of the composite and the particulate, and occupies a portion of the surface area of the particulate but reveals a portion of the particulate surface, thus, a portion of the surface area of the particulate is in contact with and is occupied by polymer and a portion is not occupied by the polymer and is available to contact by any agent that can penetrate the resulting porosity of the composition into the unoccupied excluded volume.

DETAILED DISCUSSION

Figure 1:
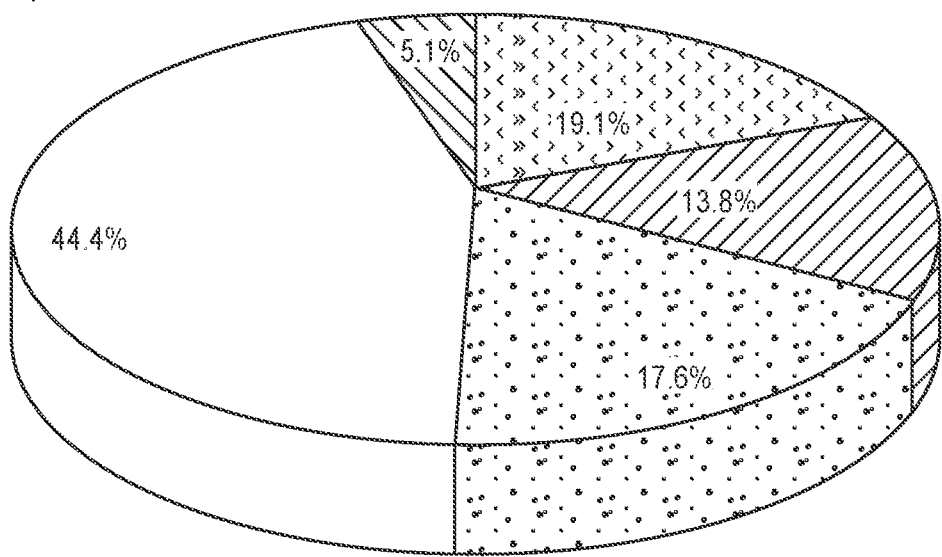
FIGS. 1-6 are charts of the Wt. % and Vol. % data of Table 5.
Figure 2:
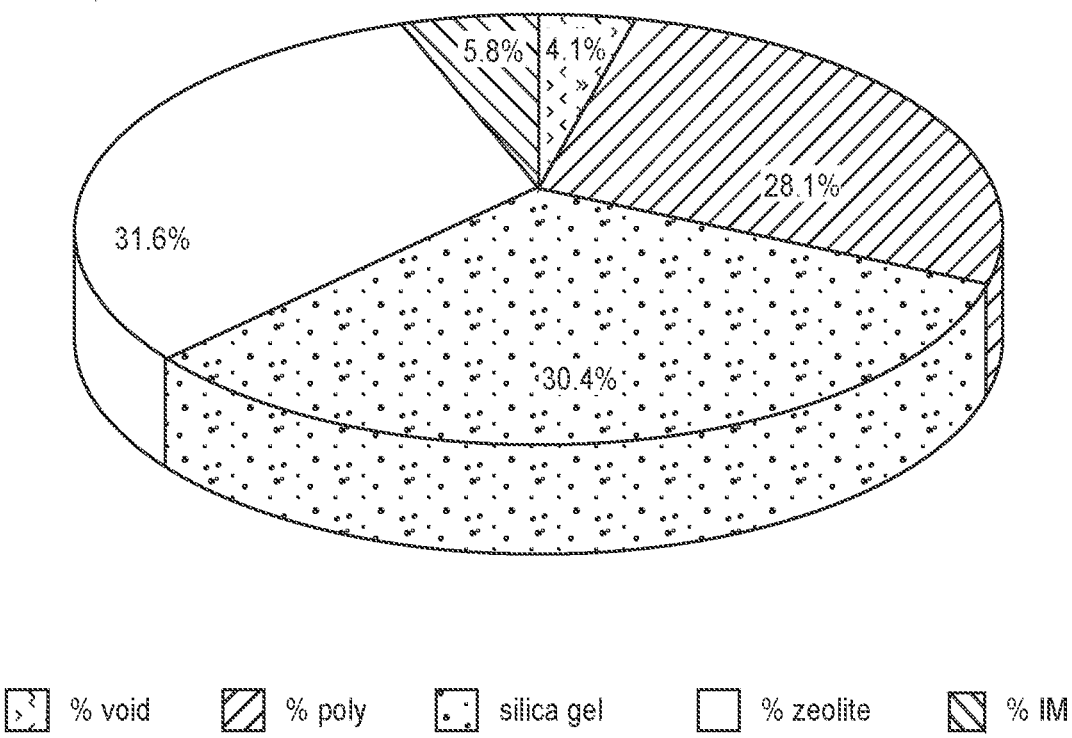
Figure 3:
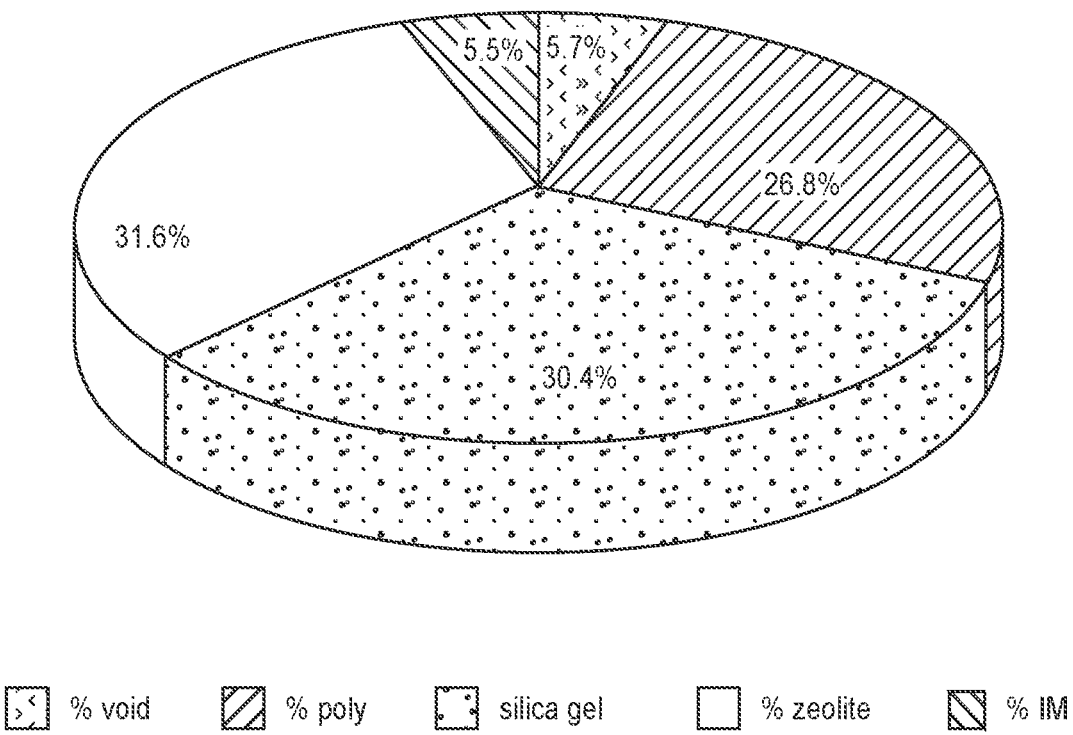
Figure 4:
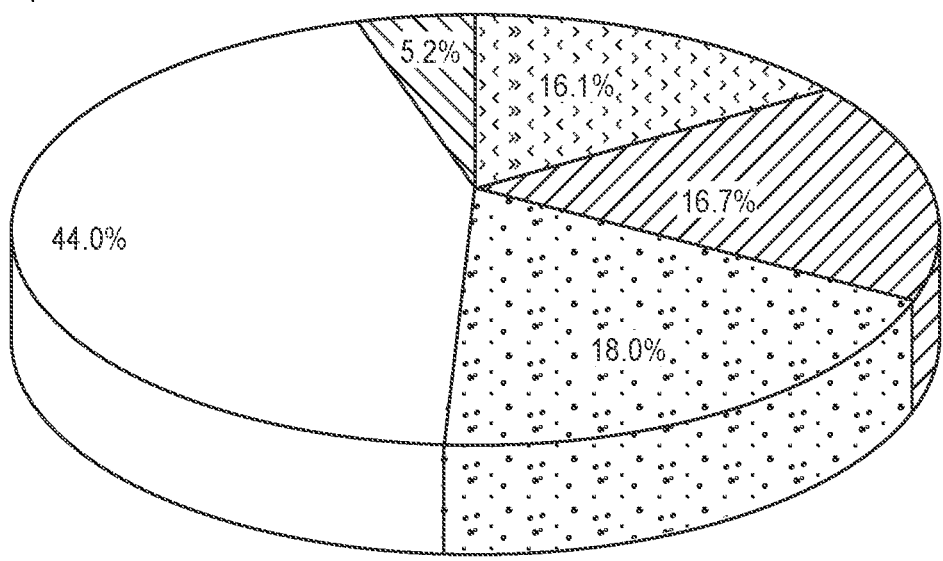
Figure 5:
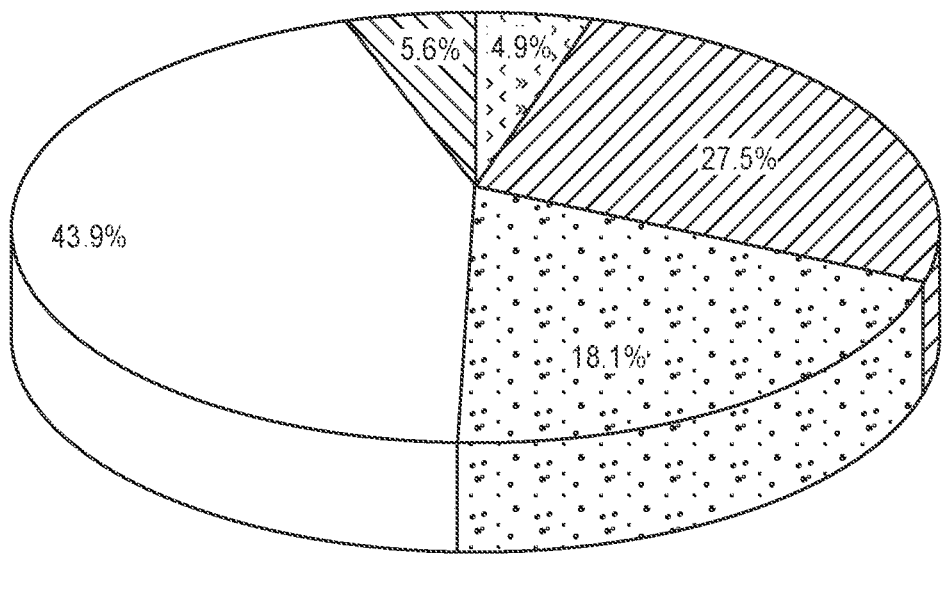
Figure 6:
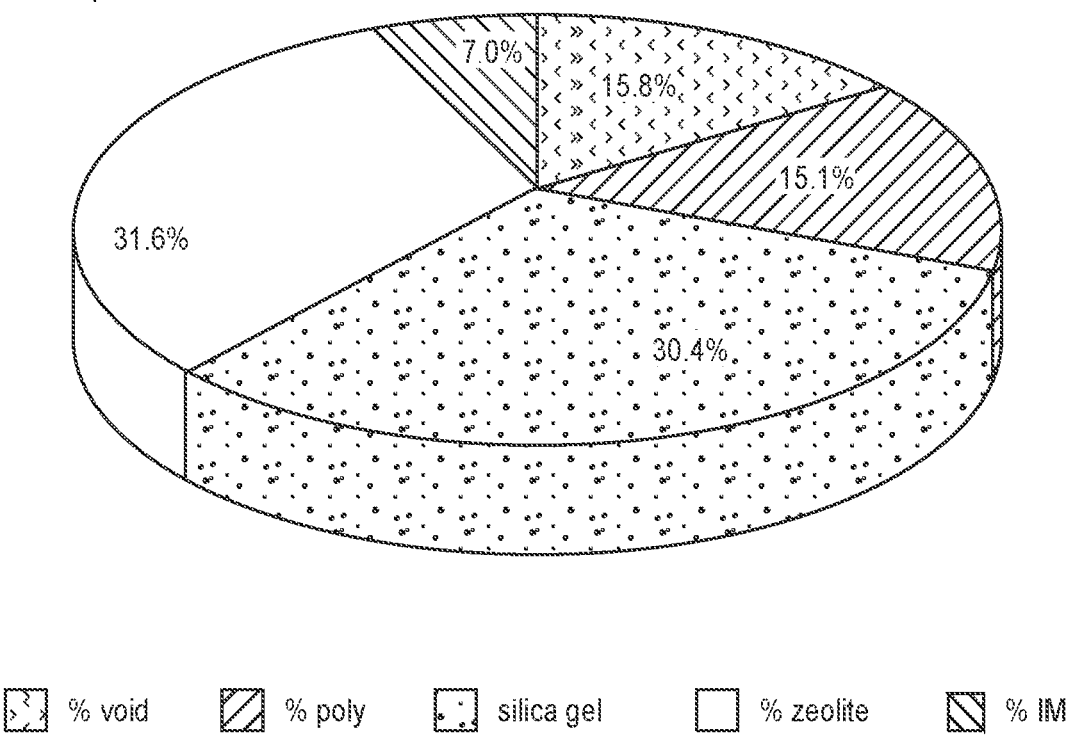

The claimed material relates to a composite composition comprising particulate having a particle size less than 500, 250 or 120 microns and an amount of a thermoplastic polymer. The composite has a particulate excluded volume is partially occupied by the polymer and the surface of the involved particle surface area is not fully covered and the balance of the surface is unavailable to contact by the presence of polymer. The composite also has a particulate excluded volume is unoccupied by the polymer and the involved particle surface area is available to contact by the absence of polymer.

In the manufacture of the claimed particle polymer composites, the maximum or critical packing volume ($V_f$), depending on morphology is known or can be easily measured by obtaining the ratio of the density of the packed material divided by its pyncnometer density.

Packing density is determined by measuring the bulk powder weight within a volume. The packing density is commonly determined by placing the powder within a metallurgical press. The press setup is available from Buehler International (Lake Bluff, Ill.). For somewhat more frangible materials, pressure is reduced to the appropriate level to reduce breakage of the powder particles thereby preventing artificially high packing density values. For very frangible materials, a tap density is used. The pycnometer density is determined by helium gas pycnometry (AccuPync 1330 manufactured by Micromeretics Corporation—Norcross, Ga.). These can also be measured using ASTM B527-93, ASTM 7481. Critical packing volume also determined using a Quanta-Chrome Dual Automap instrument set to 1000 tap cycles or equivalent instrumentation.

In the manufacture of the claimed composites, the composite is made with greater than the maximum or critical packing amount (vol. %) of particle. In such particulates, the polymer cannot easily fill the excluded volume and voids result. In the most spherical particles, the maximum theoretical packing can be as high as 90 vol. %. In more common commercial particulate, the critical packing is typically 85-5 vol. %, more commonly 75-10 vol. %. Highly irregular aspherical particulate can pack at about 60 vol. % or less. Due to process limitations, extruder design and other factors, the voids remaining are typically less than 40 vol. % about 1-35 vol. % or 2 to 30 vol. %. A large variety of polymer materials can be used with the interfacially modified particulate of the embodiment. We have found that polymer materials that are useful include both condensation polymeric materials and addition or vinyl polymeric materials. Useful polymer materials should have a melt index≥30 gms/10 min, 100 to 2000 gms/10 min commonly between 500 and 1500 gms/10 min. Crystalline or semi-crystalline polymers, copolymers, blends and mixtures are useful. Included are both vinyl and condensation polymers, and polymeric alloys thereof. Vinyl polymers include polyethylene, polypropylene, polybutylene, polyvinyl alcohol (PVA), acrylonitrile-butadiene-styrene (ABS), poly(methylpentene), (TPX®), polybutylene copolymers, polyacetal resins, polyacrylic resins, homopolymers or copolymers comprising vinyl chloride, vinylidene chloride, fluorocarbon copolymers, etc.

Vinyl polymers are typically manufactured by the polymerization of monomers having an ethylenically unsaturated olefinic group. Condensation polymers are typically prepared by a condensation polymerization reaction which is typically considered to be a stepwise chemical reaction in which two or more molecules combined, often but not necessarily accompanied by the separation of water or some other simple, typically volatile substance. Such polymers can be formed in a process called polycondensation. The polymer has a density of at least 0.85 gm-cm$^{-3}$, however, polymers having a density of greater than 0.96 are useful to enhance overall product density. A density is often up to 1.7 or up to 2 gm-cm$^{-3}$ or can be about 1.5 to 1.95 gm-cm$^{-3}$ Depending on metal particulate and end use. Vinyl polymer polymers include polymer alloys of acrylonitrile; polymer of alpha-olefins such as ethylene, high density polyethylene (HDPE), propylene, etc.; chlorinated monomers such as vinyl chloride, vinylidene dichloride, acrylate monomers such as acrylic acid, methylacrylate, methyl methacrylate, acrylamide, hydroxyethyl acrylate, and others; styrenic monomers such as styrene, alpha methyl styrene, vinyl toluene, etc.; vinyl acetate; and other commonly available ethylenically unsaturated monomer compositions. Useful vinyl fluoropolymers are perflourinated and partially fluorinated polymers made with monomers containing one or more atoms of fluorine, or copolymers of two or more of such monomers. Common examples of fluorinated monomers useful in these polymers or copolymers include tetrafluoroethylene (TFE), hexafluoropropylene (HFP), vinylidene fluoride (VDF), perfluoroalkylvinyl ethers such as perfluoro-(n-propyl-vinyl) ether (PPVE) or perfluoromethylvinylether (PMVE). Other copolymerizable olefinic monomers, including non-fluorinated monomers, may also be present.

Condensation polymers include nylon, phenoxy resins, polyarylether such as polyphenylether, polyphenylsulfide materials; polycarbonate materials, chlorinated polyether resins, polyethersulfone resins, polyphenylene oxide resins, polysulfone resins, polyimide resins, thermoplastic urethane elastomers and many other resin materials. Condensation polymers that are useful include polyamides, polyamide-imide polymers, polyarylsulfones, polycarbonate, polybutylene terephthalate, polybutylene naphthalate, polyetherimides (such as, for example, ULTEM®), polyethersulfones, polyethylene terephthalate, thermoplastic polyimides, polyphenylene ether blends, polyphenylene sulfide, polysulfones, thermoplastic polyurethanes and others. Useful condensation engineering polymers include polycarbonate materials, polyphenyleneoxide materials, and polyester materials including polyethylene terephthalate, polybutylene terephthalate, polyethylene naphthalate and polybutylene naphthalate materials. Preferred polyester condensation polymer materials include polyethylene terephthalate, polybutylene terephthalate, polyethylene naphthalate, polylactic acid, polybutylene naphthalate, etc. Such materials have a Useful molecular weight characterized by melt flow properties. Useful polyester materials have a viscosity at 265° C. of about 500-2000 cP, commonly about 800-1300 cP.

Polymer blends or polymer alloys can be useful in manufacturing the pellet or linear extrudate of the embodiments. Such alloys typically comprise two miscible polymers blended to form a uniform composition. Scientific and commercial progress in the area of polymer blends has led to the realization that important physical property improvements can be made not by developing new polymer material but by forming miscible polymer blends or alloys. A polymer alloy at equilibrium comprises a mixture of two amorphous polymers existing as a single phase of intimately mixed segments of the two macro molecular components. Miscible amorphous polymers form glasses upon sufficient cooling and a homogeneous or miscible polymer blend exhibits a single, composition dependent glass transition temperature (Tg). Immiscible or non-alloyed blend of polymers typically displays two or more glass transition temperatures associated with immiscible polymer phases. In the simplest cases, the properties of polymer alloys reflect a composition weighted average of properties possessed by the components. In general, however, the property dependence on composition varies in a complex way with a particular property, the nature of the components (glassy, rubbery or semi-crystalline), the thermodynamic state of the blend, and its mechanical state whether molecules and phases are oriented.

The waxes useful herein may include paraffin waxes, microcrystalline waxes, high-density low molecular weight polyethylene waxes, by-product polyethylene waxes, Fischer-Tropsch waxes, oxidized Fischer-Tropsch waxes and functionalized waxes such as hydroxyl stearamide waxes and fatty amide waxes. It is common in the art to use the terminology synthetic high melting point waxes to include high-density low molecular weight polyethylene waxes, by-product polyethylene waxes and Fischer-Tropsch waxes.

The claimed materials use a particle combined with polymer. Particulate with a particle size less than about 500μ can be used in the composite. The particles typically have a particle size that ranges from about 2 to 500, 2 to 400, 2 to 300, 2 to 200, or 2 to 100 microns, 4 to 300, 4 to 200, or 4 to 100 microns, and often 5 to 250, 5 to 150, 5 to 100, 5 to 75, or 5 to 50 microns. A combination of a larger and a smaller particle wherein there is about 0.1 to 25 vol. % of the smaller particle and about 99.9 to about 75 vol. % of larger particles can be used where the ratio of the diameter of the larger particles to the ratio of the smaller is about 2:1, 3:1, 4:1, 5:1, 6:1 or 7:1. In another embodiment, a tri-disperse composite, a first particulate can be about 10 micron or greater. In the embodiment, the third particulate can have a particle size less than 10 microns. The second particulate can be about 1-100 microns, but different than the first and third particulates. In certain embodiments, there may be a continuous gradient of wide particle size distributions to provide higher packing densities or packing fractions. These ratios will provide optimum self-ordering of particles within the polymer phase leading to tunable particle fractions within the composite material. The self-ordering of the particles is improved with the addition of an interfacial modifier as a coating on the surface of the particle. A particulate is chosen containing at least some particulate in the size range of 1 to 500 microns.

The proportions of particulate and polymer in the composite establish the amount of excluded volume in the composite. The claimed composite has sufficient polymer to form a weak composite but insufficient amounts to fully fill the excluded volume at maximized particulate packing densities. In an efficiently packed state, depending on particle size and particle blending of generally spherical or near spherical particulate, the particulate has an excluded volume of less than about 85 vol. %, less than about 80 vol. % or less than about 70 vol. %. The particulate sources can also comprise blends of two, three or more particulates, in a blend of particulates of differing chemical and physical nature with sufficient polymer to form the minimally bonded composite. In the composite, the particulate is obtained at the highest possible packing by a careful selection of particle size and size distribution. The excluded volume in the particulate is not substantially occupied by the polymer. Using a carefully selected finely divided material, packing the particulate and combining the particulate with just sufficient polymer to obtain a formed composite such that only a portion of the excluded volume (the space left after packing the particle distribution) of the particulate is filled can optimize material properties. In common commercial composites, the design goal is to obtain a complete fill of the excluded volume of the particulate. As such the voids remaining in the composite is less than 5, 4, 3, 2, or 1 vol. % depending on production care. Due to the morphology and chemical nature of the particulate and the IM coating, the maximum void space in a particle composite is less than 60 vol. % often 1 to 55 vol. %, 2 to 50 vol. % or 4 to 20 vol. %.

One useful particle is a porous particle. Porosity in particulate is defined by the pore size of pores in the particle and by measured surface area of the particle in the particulate. Porosity can be defined by pore sizes, which can range from about 0.1 to 50 angstroms or 2 to 4 angstroms.

Another useful particle comprises an absorbent or adsorbent particle. The distinction between absorbance and absorbance is not clear cut, but generally absorbed materials are associated with a particle internal structure while an adsorbed material is surface associated.

Typical requirements for adsorbents are:
High porosity, high internal surface.
High adsorption efficiency in a wide range of adsorbate concentrations.
Good balance between macro-pores (for fast internal transport) and micro-pores
Hydrophobic chemical structure (for treatment of moist gases) unless the adsorbent is to be used as a desiccant.
Thermal stability unaffected by a cyclic regeneration.
Mechanical integrity during handling.
Low pressure drop
Low cost for acquisition (and—eventually disposal) of adsorbents.

TABLE 2

Useful absorbents are:

| Adsorbent | Nature | Pore size (nm) | Porosity (%) | Surface area ($m^2 g^{-1}$) | Capacity $g \cdot g^{-1}$ |
|---|---|---|---|---|---|
| Alumina | Hydrophilic amorphous | 4-15 | 50 | 320 | 0.1-0.33 |
| Carbon | Hydrophobic amorphous | 1-5 | 40-90 | 200-1200 | 0.3-1 |
| Carbon Mol-sieve | Hydrophobic structured | 0.3-1 | 30-50 | 300-500 | 0.1-0.5 |
| Zeolite Mol-sieve | Hydrophilic crystalline | 0.1-1 | 10-50 | 500-800 | 0.1-0.5 |
| Polymeric | Hydrophilic amorphous | 4-30 | 30-60 | 100-1000 | 0.4-0.6 |
| Silica gel | Hydrophilic amorphous | 1-5 | 50-80 | 200-900 | 0.3-0.6 |

Interfacial modifiers provide the close association of the particulate within a particle distribution of one or many sizes. Interfacial modifiers used in the application fall into broad categories including, for example, stearic acid derivatives, organometallic compounds such as titanate compounds, zirconate compounds, hafnium compounds, samarium compounds, strontium compounds, neodymium compounds, yttrium compounds, phosphonate compounds, aluminate compounds. Useful organometallic compounds include aluminate, phosphonate, titanate and zirconate compounds useful contain from about 1 to about 3 ligands comprising hydrocarbyl phosphate esters and/or hydrocarbyl sulfonate esters and about 1 to 3 hydrocarbyl ligands which may further contain unsaturation and heteroatoms such as oxygen, nitrogen and sulfur. Commonly the titanate and zirconate compounds contain from about 2 to about 3 ligands comprising hydrocarbyl phosphate esters and/or hydrocarbyl sulfonate esters, commonly 3 of such ligands and about 1 to 2 hydrocarbyl ligands, commonly 1 hydrocarbyl ligand.

In one embodiment, the interfacial modifier used is a type of organo-metallic material such as organo-titanate, organo-boron, organo-aluminate, organo-strontium, organo-neodymium, organo-yttrium, or organo-zirconate compounds. The specific type of organo-titanate, organo-aluminate, organo-hafnium, organo-strontium, organo-neodymium, organo-yttrium, or organo-zirconate compounds may be referred to as organo-metallic compounds are distinguished by the presence of at least one hydrolysable group and at least one organic moiety. Mixtures of the organo-metallic materials may be used. The mixture of the interfacial modifiers may be applied inter- or intra-particle, which means at least one particle may have more than one interfacial modifier coating the surface (intra), or more than one interfacial modifier coating may be applied to different particles or particle size distributions (inter). These types of compounds may be defined by the following general formula:

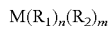

$$M(R_1)_n(R_2)_m$$

wherein M is a central atom selected from, for example, Ti, Al, Hf, Sa, Sr, Nd, Yt, and Zr; $R_1$ is a hydrolysable group; $R_2$ is a group consisting of an organic moiety; wherein the sum of m+n must equal the coordination number of the central atom and where n is an integer≥1 and m is an integer≥1.

Particularly $R_1$ is an alkoxy group having less than 12 carbon atoms. Useful are those alkoxy groups, which have less than 6, and most Useful are alkoxy groups having $C_{1-3}$ atoms. $R_2$ is an organic group including between 6-30, commonly 10-24 carbon atoms optionally including one or more hetero atoms selected from the group consisting of N, O, S and P. $R_2$ is a group consisting of an organic moiety, which is not easily hydrolyzed and often lipophilic and can be a chain of an alkyl, ether, ester, phospho-alkyl, phospho-alkyl, phospho-lipid, or phospho-amine. The phosphorus may be present as phosphate, pyrophosphato, or phosphito groups. Furthermore, $R_2$ may be linear, branched, cyclic, or aromatic.

Useful titanate and zirconate compounds include isopropyl tri(dioctyl)pyrophosphato titanate (available from Kenrich Chemicals under the designation KR38S), neopentyl (diallyl)oxy, tri(dodecyl)benzene-sulfonyl titanate (available from Kenrich Chemicals under the trademark and designation LICA 09), neopentyl(diallyl)oxy, trioctylphosphato titanate (available from Kenrich Chemicals under the trademark and designation LICA 12), neopentyl(diallyl)oxy, tri(dodecyl)benzene-sulfonyl zirconate (available from Kenrich Chemicals under the designation NZ 09), neopentyl (diallyl)oxy, tri(dioctyl)phosphato zirconate (available from Kenrich Chemicals under the designation NZ 12), and neopentyl(diallyl)oxy, tri(dioctyl)pyro-phosphato zirconate (available from Kenrich Chemicals under the designation NZ 38). One embodiment is titanate is tri(dodecyl)benzene-sulfonyl titanate (available from Kenrich Chemicals under the designation LICA 09).

The interfacial modifiers modify the particulate in the materials with the formation of a layer on the surface of the particle reducing the intermolecular forces between other particles and the polymer phase, improving the tendency of particle to mix with other particles, and resulting in increased material density. Interfacial modifier coatings on particulate, in contrast with uncoated particulate, maintain or improve the viscoelastic properties of the base polymer in the composite material. For example, such viscoelastic properties may be melt flow, elasticity, tensile modulus, storage modulus, elastic-plastic deformation and tensile elongation can be present in the composite material. Interfacial modifiers coatings on particulate also improve the rheology of the composite material causing less wear on machinery and other technology useful in melt processing. Further, the interfacial modifier coatings on particulate provide an inert surface on the particulate substrate leading to the characteristic to increase the particle packing fraction in both weight percent and volume percent aspects within the polymer phase. The coated particulate is unreactive to the base polymer or other additives in the composite material. In a sense, the interfacial modifier coatings on particulate make the particulate invisible or immiscible to the base polymer or other additives in contrast to particulate that is uncoated. Density is maximized as the number of close associations between the particulate surfaces.

The choice of interfacial modifiers is dictated by particulate, polymer, and application. The particle is completely and uniformly coated with the interfacial modifier even if having substantial surface morphology. By substantial surface morphology, visual inspection would show a rough surface to a particle substrate where the surface area of the rough substrate, considering the topography of the surface, is substantially greater than the surface area of a smooth substrate. Amounts of the interfacial modifier can be used including about 0.005 to 10 wt.-%, 0.01 to 8 wt.-%, 0.02 to 7 wt.-%, 0.02 to 6 wt. %, 0.02 to 5 wt. % or about, 0.02 to 4 wt. %. Interfacial modifying coatings or surface treatments may be applied to any particle type with an aspect ratio of less than 1:3 such as ceramic, inorganic, organic, metal particulate or their mixtures. The maximum density of a material in the composite material with the polymer is a function of the densities of the materials and the volume fractions of each. Higher density materials are achieved by maximizing per unit volume of the materials with the highest densities. More spherical particles require less interfacial modifier while rough aspherical particles require more interfacial modifier to obtain a more regular surface.

We believe an interfacial modifier is a particle surface chemical treatment. In one embodiment, the interfacial modifier is an organic material that provides an exterior coating on the particulate promoting the close association of particulate to other particulate without intra-particulate bonding or attachment and provides freedom of movement of the particles with respect to the polymer during manufacture and in use.

Composite particles are made by the following steps:
1. Interfacial Modification of particle.
2. Storage of modified particles (optional).
3. Interfacially modified particle and polymer fed into compounder.
4. Twin screw compounding to mix particles and polymer to produce the blended composite.
5. Comminution of the extrudate into a particulate of a defined particle size and particle distribution.
6. Sifting of blended composite particle product into appropriate size for application.

The composite of a particulate material and a polymer of a selected molecular weight, as measured by melt flow index, can be made such that the polymer molecular weight is reduced as particulate circularity and roughness in morphology increases. Further as particulate circularity and roughness in morphology increases the amount of interfacial modifier increases. With correct selection of polymer, interfacial modifier amount and the selection of particle type, particle porosity, particle size and particle shape, the desired composite structure and properties can be obtained.

The manufacture of the particulate coatings depends on good manufacturing technique. Such techniques are fully described in U.S. Pat. No. 7,491,356 "Extrusion Method Forming An Enhanced Property Metal Polymer Composite" and U.S. patent application publications U.S. 2010/0280164 "Inorganic Composite", U.S. 20100280145 "Ceramic Composite", and U.S. 2010/0279100 "Reduced Density Glass Bubble Polymer Composite" herein incorporated in their entirety.

The composites can contain an interfacially modified coated particulate or particulate blend dispersed in a polymer with intentionally formed voids/porosity. In polymer rich materials (less than 50-60 Vol. % polymer) the production rheology is dominated by the polymer rheology. In particulate rich composites, the production rheology is dominated by the interaction between particles and the IM particle coating. In particle rich systems the IM reduces or eliminates any particle/particle interaction that would unacceptable high production rheology. The amount of particulate cannot exceed about 90 vol % without production of a dusty powdery byproduct. As the particulate becomes more rough and aspherical, the amount of IM is increased to introduce surface regularity. As the particulate becomes more rough and aspherical, the molecular weight of the polymer is reduced to obtain useful production rheology.

The particulate is initially treated with an interfacial modifier. The IM can be directly coated or by spraying the particulate with a 25 wt.-% solution of the interfacial modifier on the particle with blending and drying carefully to ensure uniform particulate coating of the interfacial modifiers. Interfacial modifiers may also be added to particles in bulk blending operations using high intensity Littleford or Henschel blenders. Alternatively, twin cone mixers can be followed by drying or direct addition to a screw-compounding device. Interfacial modifiers may also be combined with the metal particulate in aprotic solvent such as toluene, tetrahydrofuran, mineral spirits or other such known solvents.

The interfacial modifier is coated on the prepared particle material, and the resulting product is isolated and then combined with the continuous polymer phase between the particulate and the polymer. In the composite, the coating of the interfacial modifier on the particle is less than 1 micron thick, in some cases atomic (0.5-10 Angstroms) or molecular dimensions (1-500 Angstroms) thick. In one aspect, the function of the interfacial modifier isolates the polymer from the particle as well as from the other particles. The polymer "sees" only the coating material and does not react to the interfacial modifier coating in any substantial way. The particle is "immiscible" in the polymer.

Interfacially modified materials can be made with solvent techniques that use an effective amount of solvent to initiate formation of a composite. When interfacially modification or interfacial treatment is substantially complete, the solvent can be stripped.

The composite materials can all be formed into a filament, printed via additive manufacturing techniques, molded, extruded, and sintered to make into useful composites, shapes, and articles.

The composite materials of the invention can be used to process, treat, modify, purify etc. any mobile fluid. Mobile fluids, treatable by the compositions, can include both liquid and gaseous, mobile fluids. The particulate in the composition can be used to directly treat the fluid itself, or to any component that is dissolved or suspended in the mobile fluid. The mobile fluid passes through the composite and contacts the exposed surface of the particulate, and obtains either a chemical or physical change into the mobile fluid or the components dissolved therein. Typical liquid mobile phases include both aqueous and non-aqueous liquids such as water, hydrocarbons, alcohols, etc. Gaseous mobile fluids include ambient atmosphere, hydrogen, nitrogen, carbon dioxide, hydrocarbon vapors, etc. The mobile fluids can contain a variety of substances dispersed or dissolved into the mobile fluid and include both organic and inorganic materials, both natural and inorganic components. By process, treat, modify, purify etc., the mobile fluid, we mean that the particulate in the compounds can interact with the mobile fluid or any component in the mobile fluid to absorb the component, modify the mobile fluid, or chemically react with and change the entrained materials or dispersed therein. Additionally, the surface of the particulate can be modified using a third material. Such materials include things such as antibodies, enzymes, catalytic centers, metals, etc., that either react with the mobile fluid, the constituents of the mobile fluid, or modify the mobile fluid or such compositions. The compositions of the invention can be used in both continuous and batch processing. In continuous processing, the compositions as claimed can be placed in a conduit through which the mobile fluid passes for treatment purposes. In a batch mode, the compositions of the invention can be placed in a suitable container or reaction vessel, into which the mobile fluid is introduced for contact with the compositions. And after a sufficient amount of time for absorption, modification, or reaction, the mobile fluid can move from the container or reaction vessel, leaving the composition and the reaction vessel in a batch mode. Depending on the capacity of the particulates in the compositions in the invention conduit, the composition particulate can be refreshed and regenerated using known methods for such absorbents, catalysts of the reaction materials. When used in an absorbent mode, the compositions can be used to remove water from an ambient atmosphere, or water from a hydrocarbon stream. Further, the composition of the invention can be used to remove undesirable odors from an airstream or undesirable colors from an aqueous or hydrocarbon liquid stream. In another embodiment, an active biological substance such as an enzyme, antibody or receptor protein can be absorbed onto the surface of the composite particulate and such bioactive substance can be used to modify biological materials entrained in an aqueous buffer solution.

Once the composite is used to adsorb absorb or otherwise treat a mobile phase, the composite and particulate typically is occupied by materials that arises from the mobile phase or contents thereof. Such materials can be removed and the composite treatment capacity can be restored or regenerated by heat or vacuum treatment. Any material in the composite or particulate that is volatile at conditions of heat or vacuum or combinations thereof, can be removed from the composite restoring or regenerating the activity of the composite.

DETAILED DESCRIPTION OF FIGURES

FIGS. 1-6 are charts of the Wt. % and Vol. % data of Table 5.

Figure 7:
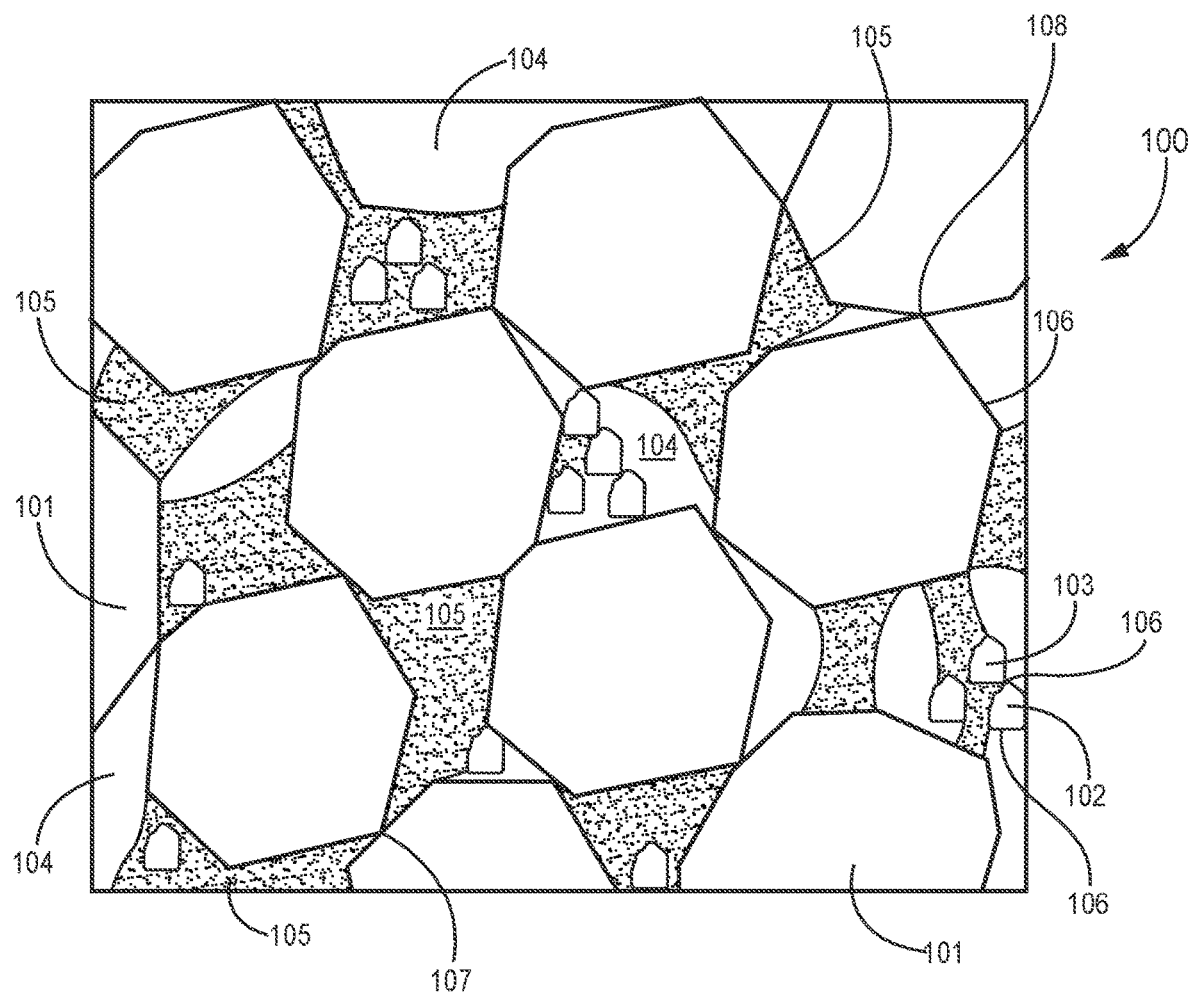
FIG. 7 is a theoretical and graphical representation of the composite showing the particles, the polymer in insufficient amounts to occupy the excluded volume and the occupied and unoccupied surfaces of the varied particulate materials.

FIG. 7 is a graphical representation of an arbitrary portion of a selection of the composite interior showing the particles, the polymer in insufficient amounts to occupy the excluded volume and the occupied and unoccupied surfaces of the varied particulate materials. In FIG. 7, the composite 100 with reduced polymer content and bonding is shown. In the composite a larger particle 101 is combined with a smaller particle 102 and a different particle 103 and polymer 105. The exterior 106 of particles 101, 102 and 103 are free of polymer and are available for contact. The unfilled void space or porosity 104 is adjacent to particle and polymer.

Particle to particle contact is seen in conjunction with filled void space 107 and in conjunction with unfilled void space 108.

EXPERIMENTAL

In summary, the composites, as dictated by the specific claims contained herein, represents a breadth of raw material combinations including; metals, inorganic particles, ceramic particles, glass bubble particles, polymers, interfacial modifiers, other additives, all with varying particle sizes, weight fractions, and volume fractions. The present embodiment also includes a breadth of processing methods, such as sintering and densification, resulting physical and chemical properties, and end-use applications.

The tables and figures show the composite can be made with substantial void measured in volume percent and the associated desiccant properties.

A useful composite can be made as follows:

TABLE 3

Exemplary Single Particle Composites

| Example | Wt. % Polymer | Wt. % Carbon | Wt. % IM | Vol. % Polymer | Vol. % Carbon | Vol. % IM | Vol. % Void |
|---|---|---|---|---|---|---|---|
| 1 | 8.0 | 91.7 | 0.275 | 9.9 | 62 | 0.4 | 27.7 |
| 2 | 19.0 | 80.8 | 0.242 | 26.8 | 62 | 0.4 | 10.8 |
| 3 | 15.0 | 84.7 | 0.254 | 20.2 | 62 | 0.4 | 17.4 |
| 4 | 10.0 | 89.7 | 0.269 | 12.7 | 62 | 0.4 | 29.4 |
| 5 | 17.0 | 82.8 | 0.248 | 23.4 | 62 | 0.4 | 14.2 |
| 6 | 19.0 | 80.8 | 0.242 | 26.8 | 62 | 0.4 | 10.8 |

TABLE 4

Exemplary Two Particle Desiccant Composites

| Example | Polymer | Particle Blend (Wt. %) | Interfacial modifier |
|---|---|---|---|
| 7 | 8 wt. % Metalocene MF650Y | 26% silica gel and 63% Zeolite | 3 wt. % |
| 8 | 19 wt. % Hytrel 5544 | 39% silica gel and 39% zeolite | 3 wt. % |
| 9 | 15 wt. % Unirez-2720 | 41% silica gel and 41% zeolite | 3 wt. % |
| 10 | 10 wt. % Unirez-2720 | 26% silica gel and 61% zeolite | 3 wt. % |
| 11 | 17% Zytel ST801 | 24% silica gel and 56% zeolite | 3 wt. % |
| 12 | 10% Zytel ST801 | 43% silica gel and 43% zeolite | 4 wt. % |

Polymers—Unirez-2720 Polyamide (Arizona Chemical), (Sp. Gray. 0.96).

Metalocene MF6560Y (0.908), Hytrel 5544 (1.22), Zytel ST801 (1.08)

Particle 1—Silica Gel 07-628200W06, Multi-Sorb Technologies, specific gravity 2.3118.

Particle 2—Zeolite (Tricat=A-3A-38, Zeochem=Purmol 3A), specific gravity 2.2254.

TABLE 5

Weight and Volume Characteristics of Examples 7 to 12

| Example | Wt. % Polymer | Wt. % Silica Gel | Wt. % Zeolite | Wt. % IM | Vol. % Polymer | Vol. % Silica Gel | Vol. % Zeolite | Vol. % IM | Vol. % Void |
|---|---|---|---|---|---|---|---|---|---|
| 7 | 8.0 | 26.0 | 63.0 | 3.0 | 13.8 | 17.6 | 44.4 | 5.1 | 19.1 |
| 8 | 19.0 | 39.0 | 39.0 | 3.0 | 28.1 | 30.4 | 31.6 | 5.8 | 4.1 |
| 9 | 15.0 | 41.0 | 41.0 | 3.0 | 26.8 | 30.4 | 31.6 | 5.5 | 5.7 |
| 10 | 10.0 | 26.0 | 61.0 | 3.0 | 16.7 | 18.0 | 44.0 | 5.2 | 16.1 |

TABLE 5-continued

Weight and Volume Characteristics of Examples 7 to 12

| Example | Wt. % Polymer | Wt. % Silica Gel | Wt. % Zeolite | Wt. % IM | Vol. % Polymer | Vol. % Silica Gel | Vol. % Zeolite | Vol. % IM | Vol. % Void |
|---|---|---|---|---|---|---|---|---|---|
| 11 | 17.0 | 24.0 | 56.0 | 3.0 | 27.5 | 18.1 | 43.9 | 5.6 | 4.9 |
| 12 | 10.0 | 43.0 | 43.0 | 3.0 | 15.1 | 30.4 | 31.6 | 7.0 | 15.8 |

A key performance attribute of desiccant material is the hydroscopic properties exhibited by the composite product. As a result, a sample desiccant particle polymer composite was evaluated by determining the % weight gain of water vapor at saturation. This was done by placing compounded product in aluminum weighing dishes that were placed in 100% humidity (i.e. in a sealed container with deionized water at the bottom). The weight gain at saturation of the compounded material was determined.

TABLE 6

Water absorbent capacity

I. Compounded and Sifted Tri-Cat

| | | | Initial | | appx. 19 Hrs. | |
|---|---|---|---|---|---|---|
| | Tare | Initial | Net Wt. | Weight | Water Vapor | % |
| EX. 7 | 53.7309 | 62.5425 | 8.8116 | 64.5595 | 2.0170 | 22.9% |
| EX. 8 | 40.0594 | 50.4639 | 10.4045 | 52.7975 | 2.3336 | 22.4% |
| EX. 9 | 39.6880 | 52.0350 | 12.3470 | 54.8030 | 2.7680 | 22.4% |

II. Compounded and Sifted Zeo-Chem

| | | | Initial | | appx. 24 Hrs. | |
|---|---|---|---|---|---|---|
| | Tare | Initial | Net Wt. | Weight | Water Vapor | % |
| EX. 10 | 49.254 | 60.7633 | 11.5091 | 63.1262 | 2.3629 | 20.5% |
| EX. 11 | 40.813 | 49.3399 | 8.5261 | 51.0596 | 1.7197 | 20.2% |
| EX. 12 | 48.628 | 55.1782 | 6.5500 | 56.4994 | 1.3212 | 20.2% |

TABLE 7

Exemplary Sodium Bicarbonate Composite

| Example | Wt. % Polymer | Wt. % Na$_2$CO$_3$ | Wt. % IM | Vol. % Polymer | Vol. % Na$_2$CO$_3$ | Vol. % IM | Vol. % Void |
|---|---|---|---|---|---|---|---|
| 13 | 5.0 | 92.0 | 3.0 | 9.5 | 64.0 | 5.1 | 21.4 |

The complete disclosure of all patents, patent applications, and publications cited herein are incorporated by reference. If any inconsistency exists between the disclosure of the present application and the disclosure(s) of any document incorporated herein by reference, the disclosure of the present application shall govern. The foregoing detailed description and examples have been given for clarity of understanding only. No unnecessary limitations are to be understood therefrom. The disclosure is not limited to the exact details shown and described, for variations obvious to one skilled in the art will be included within the disclosure defined by the claims.

Unless otherwise indicated, all numbers expressing quantities of components, molecular weights, and so forth used in the specification and claims are to be understood as being modified in all instances by the term "about." Accordingly, unless otherwise indicated to the contrary, the numerical parameters set forth in the specification and claims are approximations that may vary depending upon the desired properties sought to be obtained by the present disclosure. At the very least, and not as an attempt to limit the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the disclosure are approximations, the numerical values set forth in the specific examples are reported as precisely as possible. All numerical values, however, inherently contain a range necessarily resulting from the standard deviation found in their respective testing measurements.

All headings are for the convenience of the reader and should not be used to limit the meaning of the text that follows the heading, unless so specified.

I claim:
1. A friable extruded composite comprising
   (a) a polymer phase,
   (b) a dispersed particulate phase comprising particulate having a particle surface, the particulate phase being present in an amount of at least a critical packing volume in the polymer,
   (c) a coating comprising an interfacial modifier on the particle surface, and
   (d) a distribution of void spaces within the polymer phase, wherein the void spaces leave the particle surface exposed, and wherein the void spaces comprise 2 to 40 vol. % of the composite.

2. The composite of claim 1 wherein the bulk density is at most 95% of a filled material.

3. The composite of claim 1 wherein the void spaces comprise 2-30 vol. % of the composite.

4. The composite of claim 1 wherein the particulate comprises 40-95 vol. % of the composite having 0.001 to 8 vol. % of an interfacial modifier coating on the particle surface.

5. The composite of claim 1 wherein the particulate comprises 10-70 vol. % of the composite having 0.001 to 8 vol. % of an interfacial modifier coating on the particle surface.

6. The composite of claim 1 wherein the composite comprises a blend of two or more different particulates, wherein a difference is in particle size or composition.

7. The composite of claim 1 wherein the particulate further comprises 0.2 to 3 wt. % of an interfacial modifier on the particle surface, wt. % based on the composite.

8. The composite of claim 1 wherein the particulate comprises a carbon source, a silicate, an aluminosilicate, a zeolite, a carbonate or mixtures thereof.

9. The composite of claim 1 wherein the polymer phase has a melt index of greater than 30 g-10 sec-1.

10. The composite of claim 1 wherein the polymer phase has a melt index of 500 to 1500 g-10 sec-1.

11. The composite of claim 1 wherein the composite comprises less than 50% of a particulate surface area available to contact by the absence of polymer.

12. The composite of claim 1 comprising a bi-disperse particulate with 50-90 vol. % of a blend of two or more different particulates, each particulate having a particle size less than 500 microns, wherein each particulate comprises 0.2 to 4 wt. % of the interfacial modifier on the particle surface, and the particulate has greater than 10% of a particulate surface area available to contact by the absence of polymer.

13. The composite of claim 12 wherein the composite comprises greater than 15% of the particulate surface area available to contact by an absence of polymer.

14. A particulate comprising the composite of claim 1 comprising a particle size of 0.01 to 5 mm.

15. A particulate comprising the composite of claim 13 comprising a particle size of 0.01 to 5 mm.

16. A method of making a friable solid composite comprising a polymer phase and a dispersed particulate phase, comprising steps of:
 (a) introducing particulate and a polymer into a compounding extruder, the particulate comprising particles having a particle surface and an interfacial modifier on the particle surface, the particulate and polymer being introduced in relative amounts sufficient to provide a particulate content of at least a critical packing volume in the polymer and greater than 60 vol. % of the composite, and a distribution of void spaces within the polymer phase, wherein the void spaces leave the particle surface exposed and wherein the void spaces comprise 2 to 40 vol. % of the composite and a bulk density of less than 95% of a filled polymer and
 (b) forming the composite at a temperature greater than a melting temperature of the polymer.

17. The method of claim 16 wherein the polymer and particulate in pellet and powder form are combined before introduction into the compounding extruder.

* * * * *